United States Patent [19]

Bryg et al.

[11] Patent Number: 5,586,274
[45] Date of Patent: Dec. 17, 1996

[54] ATOMIC OPERATION CONTROL SCHEME

[75] Inventors: William R. Bryg, Saratoga, Calif.; Craig R. Frink, Chelmsford, Mass.; Larry N. McMahan, Fremont; Helen Nusbaum, Sacramento, both of Calif.

[73] Assignee: Hewlett-Packard Company, Palo Alto, Calif.

[21] Appl. No.: 217,687

[22] Filed: Mar. 24, 1994

[51] Int. Cl.$^6$ ........................................... G06F 13/00
[52] U.S. Cl. ............................................. 395/288
[58] Field of Search ................... 395/325, 425, 395/725, 288, 308, 468

[56] References Cited

U.S. PATENT DOCUMENTS

| | | | |
|---|---|---|---|
| 4,780,821 | 10/1988 | Crossley | 364/DIG. 1 |
| 4,975,870 | 12/1990 | Knicely et al. | |
| 5,163,144 | 10/1992 | Ikeno | 395/425 |
| 5,175,829 | 12/1992 | Stumpf et al. | 395/375 |
| 5,265,235 | 11/1993 | Sindhu et al. | 364/DIG. 1 |
| 5,283,886 | 2/1994 | Nishii et al. | 395/425 |
| 5,293,496 | 3/1994 | White et al. | |
| 5,313,591 | 5/1994 | Averill | 395/325 |
| 5,345,562 | 9/1994 | Chen | 395/275 |
| 5,353,414 | 10/1994 | Iida et al. | 395/325 |

FOREIGN PATENT DOCUMENTS

0336432A3  10/1989  European Pat. Off. ........ G06F 13/36

*Primary Examiner*—Jack B. Harvey
*Assistant Examiner*—Xuong M. Chung-Trans

[57] ABSTRACT

A split transaction bus system that accommodates atomic operations without locking the bus and without the possibility of deadlock during the atomic operations. The bus system may be used in a computer system that includes a bus, component modules that send transactions to each other on the bus, and a bus controller that limits the types of transactions that can be sent on the bus at any given time. When one module is performing an atomic operation, the bus controller limits transactions to those that do not change the memory image that existed when the atomic operation was commenced. The bus controller, however, permits responses or returns of data, assuming the response or return does not alter the current value of data.

6 Claims, 1 Drawing Sheet

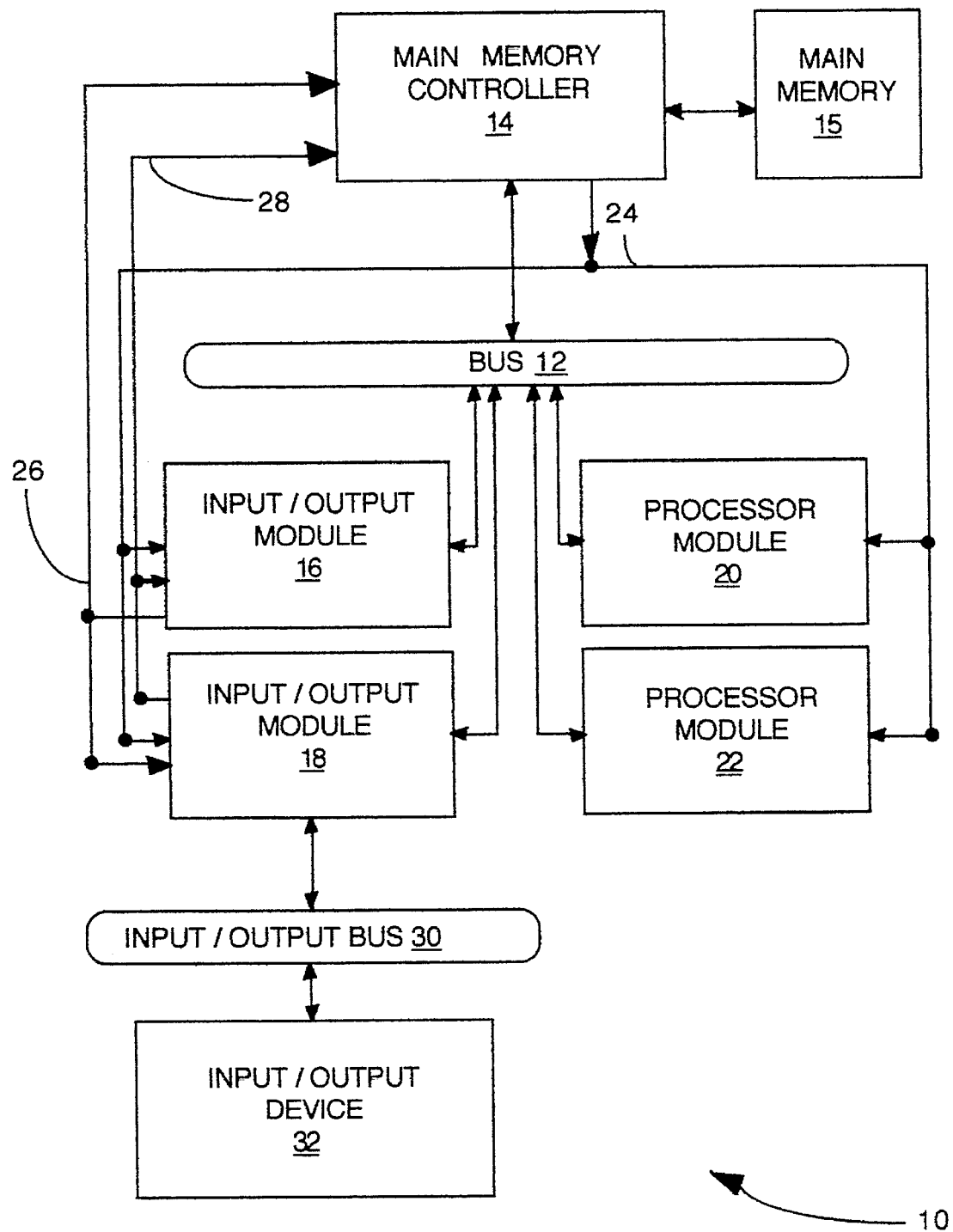
FIG._1

ATOMIC OPERATION CONTROL SCHEME

FIELD OF THE INVENTION

The present invention relates to buses, and more particularly to control of shared buses capable of carrying information among memory, input/output devices, and other components of a computer system.

BACKGROUND OF THE INVENTION

Computer systems commonly have a plurality of components, such as processors, memory, and input/output devices, and a shared bus for transferring information among the components. Typically, the components are coupled to the bus in the form of component modules, each of which may contain one or more processors, memory, and/or input/output devices. Input/output modules often consist of input/output adapters that provide an interface between the main system bus and an input/output bus to which one or more input/output devices are coupled.

Information is transmitted on the system bus among component modules during bus "cycles," each bus cycle being a period of time during which a module has control of the bus and is permitted to transfer a limited quantity of information on the bus. Modules commonly send "transactions," such as conventional "read" and "write" transactions on the bus to other modules. Each transaction generally takes one or more cycles to complete. The module entitled to control the bus during a given cycle generally is determined by an arbitration among modules that takes place during one or more earlier cycles.

In many cases, modules are required to perform a set of related transactions consecutively, without data being altered by other transactions while that set of transactions is in progress. In other words, a module may need to deal with a consistent memory image for purposes of certain sets of transactions. Such sets of transactions are generally referred to as "atomic operations" or "atomically-linked transactions." Atomic operations may be necessary, for example, where two or more modules de each required to read the data associated with a particular memory address, operate on the data, and then write the altered data back to that memory address. Software will dictate the order in which these sets of transactions must be performed and incorrect results may be obtained if the sets of transactions are not performed as atomic operations in the required order.

For example, a processor module may be required to perform an atomic operation consisting of reading data associated with a memory address (which happens to have a value of "X"), clearing the data, and writing the results of its operations (i.e., "0") to the same address. An input/output module may be required to subsequently perform an atomic operation consisting of reading data (now having a value of "0") from the same memory address, incrementing the data by one, and then writing the results (i.e., "1") to the same address. Thus, the results of these two consecutive atomic operations should be that a value of "1" is stored at the relevant memory address.

In order to ensure correct results, however, it is necessary to make certain that the processor module has completed its atomic operation before the input/output module reads the data. If the input/output module were to read the data before the processor module has completed its write transaction, incorrect results will be obtained regardless of the order in which the write transactions are performed. Specifically, the input/output module would read a value of "X," increment the data, and subsequently write a value of "X+1" to that memory address. Assuming that the processor module had already completed its write transaction by the time the input/output module writes this value, the incorrect value "X+1" would remain at the relevant memory address after each module had performed its operations. If the processor module had not yet completed its write transaction, it would subsequently write an incorrect value of "0" to the address.

In many conventional bus systems, proper execution of atomic operations is assured by allowing a module to "lock" the bus, that is to prevent any other module from using the bus, while that module is performing atomic operations. Thus, if a module must perform an atomic operation, it simply locks the bus for the number of cycles necessary to complete all atomically-linked transactions and subsequently releases its "lock," allowing other modules to utilize the bus.

If multiple buses are linked and the transaction involves transmitting information over more than one bus, it is generally necessary to lock all buses while the atomically-linked transactions are being performed. For example, conventional EISA ("Extended Industry Standard Architecture") cards for transmitting information on an EISA bus are capable of issuing up to 64 atomically-linked transactions. The EISA bus may be coupled through a bus adapter to an input/output bus, which is in turn coupled through an input/output bus adapter to a main computer bus that is coupled to a computer's main memory. Thus, the cards may interface with the computer's main memory through an EISA bus, an input/output bus, and a main computer bus. In many prior art systems, the input/output bus and the main computer bus are both locked during the entire period necessary for the 64 atomically-linked transactions, and no other module is entitled to win arbitration for the computer bus during this period. A disadvantage of locking the bus is that many bus cycles may be "wasted" during the period in which the bus is locked. The reason for this is that each atomically-linked transaction may involve processing time during which time the bus is not used. Additionally, the latency time of the memory during read transactions may be several bus cycles.

Processing atomic operations is somewhat more complicated in the case of "split transaction" buses, especially where one or more modules coupled to the bus has a cache memory. Split transaction buses are designed to reduce the impact of delays associated with memory latency by allowing modules to issue transactions while earlier issued transactions are in progress. For example, in split transaction buses, a response to a read transaction need not immediately follow a request, and the bus may be used for other transactions during the period in which the requested data is being retrieved. When the responding module is ready to return the requested data, the responding module arbitrates to obtain control of the bus and then sends the requested data to the requesting module. Thus, split transaction buses generally eliminate the need to "waste" bus cycles while requests for data are being processed.

Locking a split transaction bus can result in the system becoming deadlocked. Specifically, a module may lock the bus while one or more split transactions previously issued by other modules are in progress (that is, have not been responded to). One of the atomically-linked transactions may require data that cannot be obtained until an earlier issued transaction is completed, but the earlier issued transaction cannot be completed because the bus is locked.

As an example of a system becoming deadlocked in the above manner, it is useful to consider the case of a shared-memory multiprocessor computer system in which one or more processors has a cache memory. In such a computer, the most current data associated with a particular memory address at any given time may be stored in one or more cache memories, and/or in the main memory. When a module requests data from a memory address, a conventional "cache coherency scheme" ensures that the most current data is supplied by the module or memory having the current data.

Assuming an input/output module locks the bus for an atomic operation, however, one of the atomically-linked transactions may request data whose current value is stored only in a processor's cache memory. Since the bus is locked, the processor is unable to arbitrate for the bus to return the data, and the system becomes deadlocked. It might be possible to detect the deadlock and provide for temporary removal of the lock, but such a design would not meet EISA standards for atomicity. Furthermore, the added hardware would increase the cost of the system.

Accordingly, there is a need for a means for accommodating atomic operations on a split transaction bus without causing deadlock.

SUMMARY OF THE INVENTION

Broadly, an object of the present invention is to provide an improved split transaction bus.

A further object of the present invention is to provide a means for accommodating atomic operations on a split transaction bus without causing deadlock.

Another object of the present invention is to provide a means for accommodating atomic operations without unnecessary delays due to locking the bus.

These and other objects of the present invention will become apparent to those skilled in the art from the following detailed description of the invention and preferred embodiments, the accompanying drawing, and the appended claims.

Broadly stated, the present invention is a bus system for coupling a set of component modules to a memory. Each component module is capable of issuing and receiving transactions on a bus. The transactions on the bus are divided into two or more types, including a first transaction type that alters or samples the image of memory relative to the image of memory at the time a transaction of the first transaction type is placed on the bus and a second transaction type that does not alter or sample the memory image existing at the time a transaction of the second transaction type is placed on the bus.

The bus system includes a bus coupling the component modules to each other and to the memory. Each component module includes means responsive to an external signal for limiting the type of transactions issued by the module on the bus. At least one module also includes means for generating an atomic signal indicative of the module's need to issue one or more atomic transactions.

The bus system also includes a bus control means, responsive to the atomic signal, for generating a transaction type allowed signal to the component modules. The transaction type allowed signal prevents the component modules from issuing transactions of the first transaction type.

BRIEF DESCRIPTION OF THE DRAWINGS

FIG. 1 is a block diagram illustrating the preferred embodiment of a bus system utilizing an atomic operation control scheme according to the present invention.

DETAILED DESCRIPTION OF THE INVENTION AND PREFERRED EMBODIMENTS

The present invention encompasses a split transaction bus that may be used with a computer system and accommodates atomic operations without locking the bus and without the possibility of deadlock during the atomic operations. The computer system includes a bus, component modules that send transactions to each other on the bus, and a bus controller that specifies the types of transactions that can be sent on the bus at any given time.

The bus controller is preferably connected to the main memory used by the component modules to store information. One or more of the modules may also have local cache memories. The contents of memory at any given time may be viewed as a list of addresses and data values associated with each address. In general, there is one location in main memory associated with each memory address in some predetermined range of addresses. The location of the most current data associated with one of these addresses may be in main memory or in one of the cache memories located in some of the component modules. A memory image at time t is functionally equivalent to a list of the addresses in the above-mentioned range and the data associated with each address at the time t. For convenience, time t will be defined as the time at which a transaction is placed on the bus.

Two classes of transactions can be identified with respect to time t, those that change the memory image from its value at time t or sample the memory image, and those that do not change or sample the memory image. An input/output write transaction issued after time t changes the memory image, since it alters the data associated with at least one address. A read transaction samples the memory image. In contrast, the return of data to a processor in response to a transaction issued before time t or a cache-to-cache copy do not alter or sample the memory image. The data return provides data associated with the image at a time before time t. The cache-to-cache copy operation does not change any data value since such a transaction merely changes the physical location at which the data associated with an address is stored. Similarly, the write-back of private/dirty data from a processor's cache to memory does not change the data value, since the transaction merely changes the physical location of the data from a cache to the main memory.

When one module is performing an atomic operation, the bus controller limits transactions to those that do not change the memory image at the time the atomic operation is commenced. The bus controller, however, permits responses or returns of data, assuming the response or return does not alter the memory image.

A block diagram of an exemplary computer system according to the present invention is shown at 10 in FIG. 1. Computer system 10 is a multiprocessor computer having a bus 12 and a plurality of components coupled to bus 12. The components include a main memory controller 14, input/output modules 16 and 18, and processor modules 20 and 22. The components communicate with one another by sending and receiving transactions on bus 12. The components may arbitrate for control of bus 12 using any conventional arbitration scheme.

Bus 12 is a high performance processor-memory-I/O interconnect bus. Bus 12 is a split transaction bus. For example, after a READ transaction is issued on bus 12, the module that issued the READ relinquishes the bus allowing other modules to use the bus for other transactions. When the requested data is available, the responding module for the READ arbitrates for the bus, and then transmits the data. WRITE transactions are not split, so the master transmits the WRITE data immediately following the address cycle.

Processor modules 20 and 22 are the main processors for computer system 10, and software for the system executes simultaneously on all processors.

Input/output modules 16 and 18 serve as interfaces between computer system 10 and input/output devices. Input/output modules 16 and 18 each contain at least one input/output adaptor that is coupled between bus 12 and an input/output device, generally through an input/output bus. An exemplary input/output bus 30 and an exemplary input/output device 32 are shown coupled to input/output module 18.

Input/output modules 16 and 18 control STOP_MOST lines 26 and 28, respectively. The STOP_MOST lines allow the input/output modules to take effective control of the memory system for atomic operations. This is useful, for example, when several memory operations must be performed by a module without other modules reading data from or writing data to relevant memory addresses. When an input/output module asserts STOP_MOST, it becomes "atomic owner" of bus 12. As explained further below, when STOP_MOST is asserted, only the atomic owner is allowed to issue new transactions. Other modules are allowed to issue only return or response-type transactions that do not change the current memory image. If more than one input/output module simultaneously asserts STOP_MOST, any conventional arbitration algorithm may be used to determine which input/output module becomes atomic owner.

Main memory controller 14 is responsible for reading information from the main memory 15 and storing information in main memory 15 in a conventional manner. Main memory controller 14 preferably also serves as the "host" module or "bus controller" for purposes of dictating the manner in which bus 12 may be used by the remaining modules, which can be considered client modules. Specifically, main memory controller 14 controls a CLIENT_OP line 24, which is coupled directly to each client module. Main memory controller 14 sends signals to each client module on CLIENT_OP line 24 to indicate what types of transactions may be placed on bus 12 during the next available cycle. CLIENT_OP line 24 is used to limit the types of transactions issued on the bus when STOP_MOST is being asserted for an atomic operation. The use of CLIENT_OP line 24, along with its use for accommodating atomic operations, is explained in more detail below.

In addition to the main memory, any or all client modules (both processor and input/output) may have a conventional cache memory for storing recently used data. Ordinarily, a cache memory stores both the frequently used data and the addresses where these data items are stored in main memory. When the processor seeks data from an address in memory, it requests that data from the cache memory using the address associated with the data. The cache memory checks to see whether it holds data associated with that address. If so, the cache memory returns the requested data directly to the processor. If the cache memory does not contain the desired information (i.e., a "cache miss" occurs), the cache requests the data from main memory and stalls the processor while it is waiting for the data. Since cache memory is faster than main RAM memory, this strategy results in improved system performance.

In the case of a shared memory multi-processor computer such as computer system 10, the situation is somewhat more complex. The most current data may be stored in one or more cache memories, or in the main memory. Software executing on the processors must utilize the most current values for data associated with a particular address. Thus, a "cache coherency scheme," must be implemented to assure that all copies of data for a particular address are the same. Many conventional cache coherency schemes are available and are widely known in the art.

In a typical write-back coherency scheme, when data is requested by a module, each module having cache memory performs a "coherency check" of its cache memory to determine whether it has data associated with the requested address and reports the results of its coherency check. Each module also generally reports the status of the data stored in its cache memory in relation to the data associated with the same address stored in main memory and other cache memories. For example, a module may report that its data is "private" (i.e., the data value is only usable by this module) or that the data is "shared" (i.e., the data may reside in more than one cache memory at the same time). A module may also report whether its data is "clean" (i.e., the same as the data associated with the same address stored in main memory) or "dirty" (i.e., the data has been changed after it was obtained).

The results of the coherency checks performed by each module are analyzed by a selected processor and the most current data is provided to the module that requested the data. A "coherent transaction" is any transaction that requires a check of other caches to see whether data associated with a memory address is stored in the other caches, or to verify that data is current. Most reads and some writes to memory are coherent transactions. Those skilled in the art are familiar with many types of coherent transactions, such as a conventional read private, and non-coherent transactions, such as a conventional write-back.

In a preferred embodiment of the present invention, the CLIENT_OP bus supports the signals shown in Table 1.

TABLE 1

| Name | Value | Significance for Next Available Cycle |
|---|---|---|
| NONE_ALLOWED | 010 | No TRANS_ALLOWED, but clients still control bus |
| RET_ONLY | 100 | Return or response TRANS_ALLOWED |
| ATOMIC | 110 | Client who is "atomic owner" can issue any transaction, other clients can issue only responses. |
| ANY_TRANS | 111 | Any transaction allowed |

The ATOMIC client option signal relates directly to atomic control of the bus. The other CLIENT_OP signals from Table 1 are not critical to atomic control of the bus according to the present invention. These other signals are included, for illustrative purposes, to show other possible ways that the CLIENT_OP bus may limit the transactions allowed during a given cycle if the ATOMIC client option signal is not in use. These other CLIENT_OP signals will be briefly explained as well.

A client option signal of ANY_TRANS indicates that any transaction is allowed during the next available cycle.

The "ATOMIC" client option signal is generated in direct response to a client asserting STOP_MOST. The ATOMIC client option signal allows the client asserting STOP_MOST to perform several atomically-linked transactions on bus 12. When ATOMIC is asserted, all other clients are only allowed to respond to earlier sent transactions, or to send data in a manner that does not alter the memory image, such as write-backs of previously held private-dirty cache lines. The following types of conventional transactions are preferably allowed while a client option signal of ATOMIC is asserted: cache-to-cache writes, write-backs, error notification transactions, input/output data returns, memory data returns.

The above-listed transactions are allowed during an ATOMIC client option signal because they do not change the image of memory viewed by the input/output device performing the atomic operation. In other words, the most current data associated with an memory address will not be altered by these transactions. The allowed transactions may, however, move data from one location in the computer system (e.g., a cache memory) to another location (e.g., a different cache memory or the main memory). Moving the data in this manner, however, will not affect the most current data value associated with each memory address and, therefore, the input/output device will deal with a consistent memory image whether or not any allowed transactions are performed during the ATOMIC client option signal.

New reads are not allowed by other modules while ATOMIC is asserted because they would result in the memory being sampled in the midst of an atomic operation. This may result in an incorrect data value being read if subsequent atomically-linked transactions within the relevant atomic operation alter the data that was read.

The RET_ONLY is an optional, exemplary client option signal that indicates that only returns (write-backs) of previously held private-dirty cache lines, or responses to previous transactions are allowed. For example, if processor module 20 issues a read of data that is held private-dirty in processor 22's cache, processor 22 can supply that cache line in a conventional cache-to-cache copy. That cache-to-cache copy transaction can be initiated under the influence of a RET_ONLY client option signal, since the cache-to-cache copy is generally a response to a read and does not require a module to accept a new transaction for processing. Similarly, input/output module 16 can return data from an earlier input/output read transaction under the influence of a RET_ONLY client option signal.

It will be appreciated that, when there is an atomic owner, the effective client option signal for the atomic owner is ANY_TRANS and the effective client option signal for all other clients is RET_ONLY.

In accordance with the present invention, an input/output module that needs to perform an atomic operation will assert its STOP_MOST line, which is coupled to main memory controller 14 and to the other input/output module. In response, main memory controller 14 will change the client option signal to ATOMIC. If more than one input/output module has asserted STOP_MOST, the modules will arbitrate among themselves (according to any conventional arbitrations scheme) to determine which module will perform its atomic operation during the ATOMIC client option signal.

As explained above, when ATOMIC is asserted, no other modules are permitted to perform transactions that alter the state of memory: that is, no transactions are allowed that change the value of data that is current at the time the atomic operation is commenced. Thus, the atomic operation can be performed effectively without interference from other modules. When the atomic operation is completed, the module de-asserts its STOP_MOST line.

It will be appreciated by those skilled in the art that memory controller 14 serves as the host, or bus controller, for convenience only, and that host functions and memory control functions may be separated into two or more modules.

The terms "bus(es)" and "line(s)" have both been used in this detailed description to denote various sets of one or more electrical paths that are more fully described above. It will be appreciated by those skilled in the art that the terms "bus" and "line" are not intended to be mutually exclusive or otherwise limiting in themselves. For example, the terms "CLIENT_OP bus" and "CLIENT_OP lines" have been used interchangeably to denote a set of hardware lines driven only by the host, as described more fully above.

Various modifications to the present invention will become apparent to those skilled in the art from the foregoing description and accompanying drawings. Accordingly, the present invention is to be limited solely by the scope of the following claims.

What is claimed is:

1. A bus system for coupling a plurality of component modules to a memory, each of said component modules being capable of issuing and receiving transactions on a bus, said transactions being divided into a plurality of types, said types including a first transaction type that alters the image of memory relative to the image of said memory at the time a transaction of said first transaction type is placed on said bus and a second transaction type that does not alter the image of memory relative to the image of said memory at the time a transaction of said second transaction type is placed on said bus, said bus system comprising:

a bus coupling said component modules to each other and to said memory, one of said component modules including means responsive to a signal external to said one of said component modules for limiting the type of transactions issued by said module on said bus, at least one of said component modules further comprising means for generating an atomic signal indicative of that module's need to issue one or more atomic transactions; and bus control means, responsive to said atomic signal, and connected to all of said component modules, for generating and coupling a transaction type allowed signal to all of said component modules, said transaction type allowed signal preventing one of said component modules from issuing transactions of said first transaction type, while allowing one of said component modules to issue transactions of said second transaction type.

2. The bus system of claim 1, wherein said modules have means for arbitrating among themselves for control of the bus based on said transaction type allowed signal.

3. The bus system of claim 1, wherein two of said modules include cache memories and said second transaction type includes cache-to-cache copies between said two modules.

4. The bus system of claim 1, wherein said second transaction type includes transactions returning data in response to a transaction issued before said transaction type allowed signal was coupled to said component modules.

5. The bus system of claim 1, wherein said first transaction type includes transactions that read data from the memory.

6. The bus system of claim 1, wherein at least one module includes a cache memory and said second transaction type includes write-backs of dirty data from said cache memory to said memory.

* * * * *